United States Patent [19]

Condrac

[11] 4,066,949
[45] Jan. 3, 1978

[54] PROBE HOLDER FOR A MACHINE BODY POSITION SENSOR, WITH MEANS TO INCREASE ITS NATURAL FREQUENCY

[75] Inventor: Edward J. Condrac, East McKeesport, Pa.

[73] Assignee: Carrier Corporation, Syracuse, N.Y.

[21] Appl. No.: 720,012

[22] Filed: Sept. 2, 1976

[51] Int. Cl.² ........................................... G01R 33/12
[52] U.S. Cl. ............................ 324/262; 248/358 R; 324/207; 324/158 P
[58] Field of Search ............ 324/34 R, 34 D, 34 PS, 324/34 GT, 34 TK, 40, 61 P, 65 P, 173, 175, 158 P; 340/195, 196; 336/45, 92, 100; 248/358 R

[56] References Cited

U.S. PATENT DOCUMENTS

| | | | |
|---|---|---|---|
| 3,128,978 | 4/1964 | Sykes | 248/358 R |
| 3,898,562 | 8/1975 | Mizikar et al. | 324/158 P |
| 3,977,072 | 8/1976 | Schonstedt | 336/92 |

*Primary Examiner*—Robert J. Corcoran
*Attorney, Agent, or Firm*—J. Raymond Curtin; Barry E. Deutsch

[57] ABSTRACT

A probe holder assembly includes a probe holder mounted in cantilevered fashion within a support structure. The support structure includes a generally elongated cylindrical housing. The elongated free end of said holder extends substantially coaxial within said housing. The holder includes a pair of spaced circumferentially extending grooves formed on the outer surface thereof in proximity to the holder's free end. Each of the grooves has a resilient ring provided therein, with the outer surface of each ring being in contact with the inner surface of said housing portion to provide a resilient support structure for said holder within said housing.

1 Claim, 2 Drawing Figures

PROBE HOLDER FOR A MACHINE BODY POSITION SENSOR, WITH MEANS TO INCREASE ITS NATURAL FREQUENCY

BACKGROUND OF THE INVENTION

This invention relates to improvements in a holding assembly for an electrical probe provided to observe one body relative to another, and in particular, to a probe holder having an improved support system.

The utilization of sensing probes to detect the position, speed, or vibrations of various types of structures is widespread in many industries. Such probes have been employed in rotary machinery to sense the position of an observed body, for example the rotor of either a turbine or a compressor, relative to a fixed point of reference, for example the probe. Conventionally, many probes of this type rely upon the Eddy current principle for measuring such things as shaft runout, vibrations, speed, and the like. An RF voltage generator is generally employed to provide a level of voltage that is proportional to the gap distance between the probe sensor element and the structure being observed. The gap distance between the sensor and the observed body must be accurately controlled so that changes in the voltage output of the RF voltage generator are linear in respect to the distance measured.

An example of probes of the type under discussion is disclosed in prior U.S. Pat. No.. 3,898,562. It has been found in some applications, that vibration of the probe holder assembly has generated spurious output signals due to movement of the probe tip. As the probe and its holder assembly are mounted in the probe mounting structure in a cantilevered manner, any vibration of the assembly will result in accentuated movement of the probe. Vibration of the probe holder assembly has resulted from the rotary machine operating at speeds approaching the natural frequency of the probe holder assembly. It has been determined that resonant conditions may be avoided by maintaining the undamped, fundamental mode natural frequency of the holder assembly above the second harmonic of maximum machine running speed. For example, to compensate for variations in different installations and to avoid excitation of the probe holder, the undamped, fundamental mode natural frequency of the assembly should be maintained at least 20 Hertz above the second harmonic of the maximum machine running speed.

The probe disclosed in the aforecited patent is externally mountable. Replacement probes may be accurately positioned while the rotary machine remains in operation. It is extremely desirable that this feature be maintained while eliminating the vibration problem resulting from operation of the machine at or near resonant conditions of the probe holder.

SUMMARY OF THE INVENTION

It is an object of this invention to eliminate the false generation of signals resulting from vibratory movement of a probe and its holder assembly.

It is a further object of this invention to increase the undamped, fundamental mode natural frequency of a probe holder assembly above the second harmonic of maximum machine running speed.

It is a further object of this invention to support a cantilevered mounted probe and probe holder assembly to eliminate vibration thereof resulting from the machine in which the probe is installed running at speeds approaching resonant conditions, yet maintain the removable feature of the probe assembly.

These and other objects of the instant invention are attained in an assembly for holding a sensing device operable to electrically observe the position of a body contained within a machine over a defined air gap. The sensing device holding assembly includes a mounting structure secured to the outside of the machine; said structure has a generally elongated cylindrical housing section extending through an opening in the machine. A removable probe holder is supported in cantilevered fashion within the mounting structure, the elongated free end of the holder extends substantially coaxial within the elongated housing section. The probe holder terminates in closely spaced relation to the observed body. The holder has a pair of spaced circumferentially extending grooves formed on the outer surface thereof in proximity to the free end thereof, each of the grooves having a resilient ring provided therein, with the outer surface of each of the rings being in contact with the inner surface of the housing section to provide a resilient support structure for the holder within the housing.

DESCRIPTION OF THE PREFERRED EMBODIMENT

Figure 1:
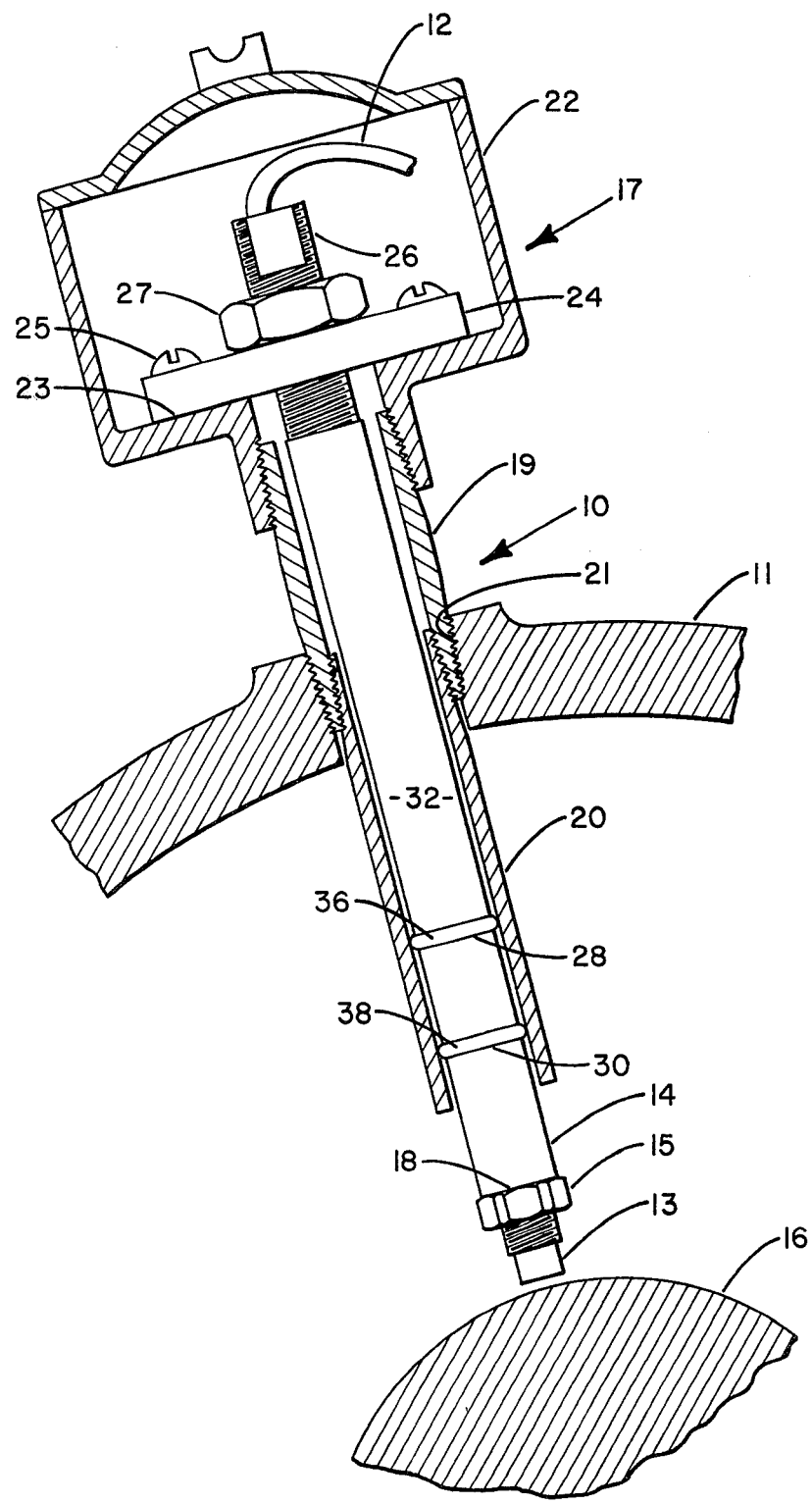
FIG. 1 is a sectional view illustrating a probe assembly embodying the teachings of the present invention with the probe being positioned to observe the rotor of a rotary machine.
Figure 2:
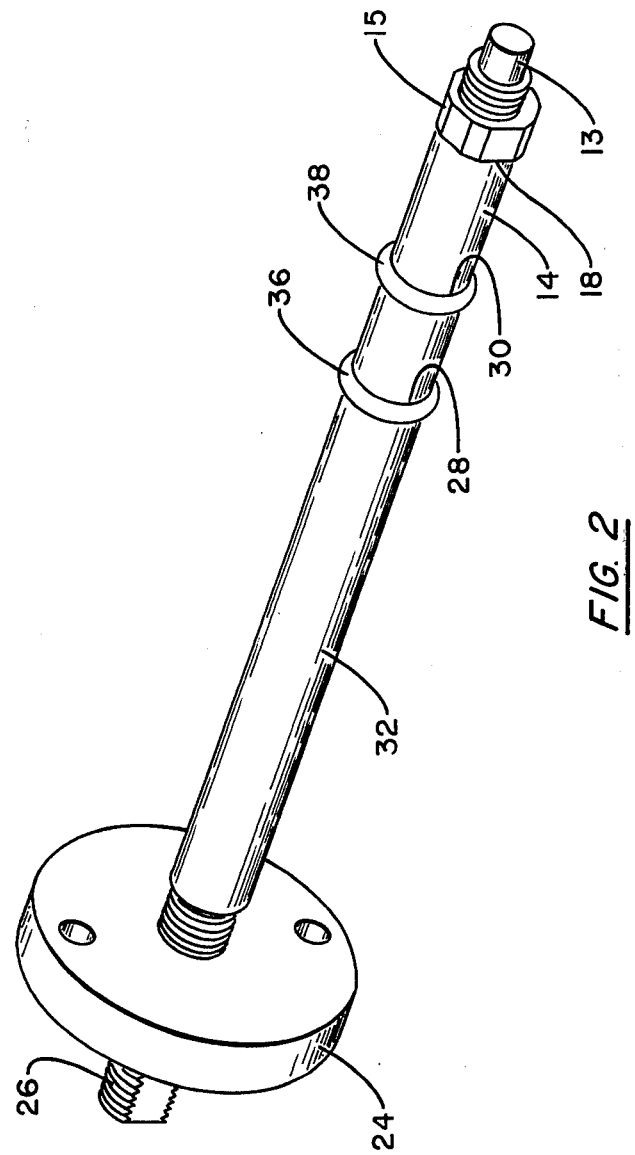
FIG. 2 is a perspective view of a portion of the probe assembly illustrated in FIG. 1.

Referring now to the drawings, there is illustrated an electrical probe assembly 10 relying upon the Eddy current principle to measure the distance or change between a probe and of an observed body over a very small span or gap. In the particular embodiment illustrated, the probe assembly is mounted upon casing 11 of a rotary machine, such as a turbine or a compressor, and contains a probe or sensing device 13 threaded into the free end 18 of an extended probe holder 14. A locking nut or similar device 15 is provided to insure that probe 13 remains secured to holder 14. The sensing probe is electrically connected to an RF voltage generator (not shown) by means of a cable 12 running through the holder and being carried outside of the machine casing. In the particular embodiment, the body observed is shaft or rotor 16 of the rotary machine. It should be understood, however, the present invention has wider application and may be utilized to detect the position, speed, or vibrations of any type of structure and is not necessarily restricted to sensing the position of a shaft in the manner herein disclosed.

As illustrated in FIG. 1, the probe holder of the present invention is supported within a mounting structure 17, affixed to casing 11 of the rotary machine by means of threaded sleeve sections 19 and 20. Threaded portions 19 and 20 define a generally elongated cylindrical housing section which extends through opening 21 provided in casing 11. The elongated free end of probe holder 14 extends substantially coaxial within the housing section defined by threaded portions 19 and 20. Threaded portion 19 is secured at its upper end to upper housing portion 22 of the mounting structure. A finished surface 23 is machined upon the bottom internal wall of upper housing portion 22. A bush plate 24, arranged to support the probe holder assembly in a cantilevered fashion within upper housing portion 22 is securely affixed to finished surface 23 by means of mounting screws 25. A lock nut or similar device 27 is provided to securely connect the upper threaded portion 26 of probe holder 14 to bush plate 24.

As probe holder 14 is mounted in a cantilevered manner within the mounting structure, it has been found, that under certain operating conditions, the probe holder and thus the probe will vibrate due to operation of the machine at resonant conditions. Vibrations of the probe have produced spurious output signals. As the probe holder is mounted in a cantilevered manner within housing portions 19, 20 and 22, movement of the probe holder and probe sensor due to vibration has been amplified as the length of the probe holder is increased.

As disclosed in previously cited U.S. Pat. No. 3,898,562, assigned to the same assignee as the assignee hereof, one of the primary features of probe holder assemblies of the type heretofore described is the capability to remove and replace the probe holder and probe while the machine is running. It is extremely desirable that this feature be maintained as it is extremely undesirable to require that a machine employing a probe be dismantled or otherwise shutdown when replacement of the probe is necessary. Thus, the elimination of the vibration problems must be accomplished without eliminating the desired removability feature.

In order to increase the frequency at which the probe holder will resonate, probe holder 14 has a pair of spaced circumferentially extending grooves 28 and 30 formed on its outer surface 32 in proximity to free end 18 thereof. Each of the grooves 28 and 30 have a resilient ring, illustrated in the form of O-rings 36 and 38 provided therein, with the outer surface of each of the rings being in contact with the inner surface of sleeve portion 20. The utilization of resilient rings 36 and 38 in the manner illustrated provides a resilient structure for supporting the free end of probe holder 14 within sleeve portions 19 and 20 of the mounting structure.

Test results have indicated that some probe holders and thus probe sensors have a tendency to vibrate at a given running speed of the machine. By adding the resilient support rings to the probe holder, the natural frequency of the probe holder is increased to more than two times the natural frequency of the machine when operating at maximum running speed. By providing resilient rings as the support members, the removable feature of the probe assembly will be maintained and additionally, the utilization of the resilient rings will provide a support structure that compensates for dimensional variations due to tolerances in manufacturing the various components of the probe assembly.

Test results have indicated that increasing the number of resilient rings beyond the number of two will not provide further material increases in the natural frequency of the probe holder. In addition, test results have further shown that the space between the resilient rings should be maintained at a minimum of ¾ of an inch. If the resilient rings are moved closer than ¾ of an inch, the natural frequency of the probe holder is not increased in the manner desired so as to obviate the vibration problem. Furthermore, test results have shown that grooves 28 and 30 should be formed below the midpoint of the probe holder, that is to say, the grooves should be closer to free end 18 of the holder than to bush plate 24.

In addition to the advantages heretofore discussed, the utilization of the resilient rings in the manner illustrated will prevent lubricating oil or other contaminants thrown outwardly from shaft 16 from gaining entrance into upper housing portion 22. It is particularly important to prevent oil from flowing into the housing portion since most lubricating oils have a deleterious effect on the electrical components of the probe system.

While it might be thought that the use of resilient rings would not effect a significant change in the natural frequency of probe holder 14, in fact, due to the cantilevered mounting arrangement for the holder, the addition of rings 36 and 38 substantially increases the natural frequency of the holder. One might have contemplated that the resilient nature of the rings would have a tendency to decrease the natural frequency; whereas, their use as supports would increase the natural frequency of the probe holder. Thus, a significant increase in the natural frequency of the holder was not anticipated.

While a preferred embodiment of the present invention has been described and illustrated, the invention should not be limited thereto but may be otherwise embodied within the scope of the following claims.

I claim:

1. In an assembly for holding a sensing device operable to electrically observe the position of a body contained within a rotary machine over a defined air gap, including a mounting structure secured to the outside of the machine and having a generally elongated cylindrical housing section extending through an opening in said machine, the improvement comprising:
a removable probe holder supported in cantilevered fashion within said mounting structure, the elongated free end of said holder extending substantially coaxial within said elongated housing section and terminating in closely spaced relation to said observed body, said holder having a pair of spaced circumferentially extending grooves formed on the outer surface thereof in proximity to said free end thereof, said grooves being relatively closer to the free end of said holder than to the supported end thereof, the space between said grooves being at least three-fourths of an inch, each of said grooves having a resilient ring provided therein, with the outer surface of each of said resilient rings being in contact with the inner surface of said housing section to provide a resilient support structure for said holder within said housing said rings being designed to increase the natural frequency of the holder above the second harmonic of the maximum machine running speed.

* * * * *